(12) United States Patent
Cho

(10) Patent No.: US 10,587,661 B2
(45) Date of Patent: Mar. 10, 2020

(54) METHOD AND PROGRAM FOR PROVIDING CONTENT STREAMING SERVICE AND MANAGING DATA STATISTICS OF USER USING QR CODE

(71) Applicant: PLAYCOMPANY corp., Seoul (KR)

(72) Inventor: Hyung Seok Cho, Seoul (KR)

(73) Assignee: PLAYCOMPANY corp., Seoul (KR)

( * ) Notice: Subject to any disclaimer, the term of this patent is extended or adjusted under 35 U.S.C. 154(b) by 1 day.

(21) Appl. No.: 15/959,728

(22) Filed: Apr. 23, 2018

(65) Prior Publication Data

US 2019/0327280 A1    Oct. 24, 2019

(51) Int. Cl.
| | |
|---|---|
| *H04L 29/06* | (2006.01) |
| *G06F 21/10* | (2013.01) |
| *G06K 7/14* | (2006.01) |
| *H04L 29/08* | (2006.01) |

(52) U.S. Cl.
CPC ........ *H04L 65/4084* (2013.01); *G06F 21/105* (2013.01); *G06K 7/1417* (2013.01); *H04L 67/306* (2013.01)

(58) Field of Classification Search
CPC .................................................. H04L 65/4084
See application file for complete search history.

(56) References Cited

U.S. PATENT DOCUMENTS

2012/0311723 A1* 12/2012 Britt, Jr. ................. G06Q 30/06
                                                                726/28
2016/0066035 A1*  3/2016 Chesluk ............. H04N 21/4532
                                                                725/109

FOREIGN PATENT DOCUMENTS

| JP | 2014-038379 A | 2/2014 |
|---|---|---|
| KR | 10-2003-0058660 A | 7/2003 |
| KR | 10-2013-0137805 A | 12/2013 |
| KR | 10-2017-0140508 A | 12/2017 |

OTHER PUBLICATIONS

An Office Action mailed by the Korean Intellectual Property Office dated Jun. 14, 2019, which corresponds to Korean Patent Application No. 10-2018-0077792 and is related to U.S. Appl. No. 15/959,728.
An Office Action mailed by the Japanese Patent Office dated Jul. 2, 2019, which corresponds to Japanese Patent Application No. 2018-083190 and is related to U.S. Appl. No. 15/959,728.

(Continued)

*Primary Examiner* — Suraj M Joshi
(74) *Attorney, Agent, or Firm* — Studebaker & Brackett PC

(57) ABSTRACT

A method for providing a content streaming service and managing data statistics of a user using a quick response (QR) code is provided. The method includes receiving, by a server, scan data of the QR code printed on a real content product of the user from a user terminal, authenticating, by the server, the purchase of the real content product of the user based on the scan data and registering unique information of the user terminal which transmits the scan data, registering, by the server, content corresponding to the scan data with a list of content of the user terminal, receiving, by the server, a request to stream the content registered with the list of the content of the user terminal from the user terminal, and transmitting, by the server, streaming data of the requested content to the user terminal.

7 Claims, 7 Drawing Sheets

(56) References Cited

OTHER PUBLICATIONS

Takao Honma, ~ The biggest change in the history of music playback ~ Koto changing with high res recording and streaming, quarterly, net audio, Japan, Otomoto Publishing Co., Ltd., Sep. 1, 2015, vol. 5, No. 3, p. 5, 60-63 (Documents Showing Well-known Technology); with English Concise Explanation.

* cited by examiner

METHOD AND PROGRAM FOR PROVIDING CONTENT STREAMING SERVICE AND MANAGING DATA STATISTICS OF USER USING QR CODE

BACKGROUND

Embodiments of the inventive concept described herein relate to content streaming, and more particularly, relate to a method and program for providing a content streaming service and managing data statistics of a user using a quick response (QR) code.

In the past, albums of singers were released in the form of a long playing (LP) record or a tape. Nowadays, albums are released in the form of an optical disc such as a compact disc (CD), a digital video disc (DVD), or a Blu-ray disc or in the form of a digital file capable of being played back through an MPEG-1 audio layer 3 (MP3) player, a computer, a smartphone, or the like.

Particularly, since an optical disc such as a DVD is able to store videos or various other types of high-capacity data other than audios, it has been spotlighted. Thus, recently, a variety of content, such as music video images, concert videos, pictorial magazines, and interviews of singers, have been sold in the form of being stored in optical discs.

Meanwhile, recently, as resolution of each of displays is sharply increased and as criteria of evaluating high definition are enhanced, resolution provided by DVDs does not satisfy consumers. Further, since a mobile device such as a smartphone is able to play DVDs, it is impossible to enjoy content stored in optical discs anytime or anywhere. Particularly, since content stored in optical discs is able to be downloaded and copied to another device or medium as many as people want, it is vulnerable to illegal copy and distribution.

SUMMARY

Embodiments of the inventive concept provide a method and program for providing a content streaming service and managing data statistics of a user using a QR code to authenticate the purchase of a real content product using the QR code and stream content corresponding to the QR code to a user terminal.

Embodiments of the inventive concept provide a method and program for providing a content streaming service and managing data statistics of a user using a QR code to stream higher-definition content than a real content product using a user terminal.

Embodiments of the inventive concept provide a method and program for providing a content streaming service and managing data statistics of a user using a QR code to store unique information of a user terminal, the purchase of which is authenticated, and authenticate only one terminal per QR code.

According to an exemplary embodiment, a method for providing a real content streaming service using a QR code may include receiving, by a server, scan data of the QR code printed on a real content product of the user from a user terminal, authenticating, by the server, the purchase of the real content product of the user based on the scan data and registering unique information of the user terminal which transmits the scan data, registering, by the server, content corresponding to the scan data with a list of content of the user terminal, receiving, by the server, a request to stream the content registered with the list of the content of the user terminal from the user terminal, and transmitting, by the server, streaming data of the requested content to the user terminal. The content streamed to the user terminal may be provided with higher definition than content stored in a storage medium of the real content product.

The method may further include, after a predetermined time elapses from a time when the server authenticates the purchase of the real content product of the user, when a user account logged in to the user terminal is an account for paid account, maintaining, by the server, the list of the content of the user terminal in a state where the content is able to be streamed and, when the user account is an account for free account, converting, by the server, the list of the content of the user terminal into a state where the content is unable to be streamed.

The method may further include, when the user account logged in to the user terminal is the account for paid member, additionally registering, by the server, content for paid member to the list of the content of the user terminal.

The method may further include collecting, by the server, information about a profile of a user account of the user whose purchase of the real content product is authenticated, information about the real content product, information about a profile of a user account of the user who requests to stream the content, and information about the content requested to be streamed and storing, by the server, the collected information in a big data storage of the server.

The method may further include generating, by the server, statistics information about a propensity to consume content by analyzing the information stored in the big data storage.

The QR code may be printed on the inside of a package of the real content product or on at least one surface of the storage medium of the real content product.

The content may include one or more of a text, an audio, an image, or a video.

According to an exemplary embodiment, another method for implementing the inventive concept, another system, and a computer-readable storage medium storing a computer program for executing the method may be further provided.

According to an exemplary embodiment, a program for providing a real content streaming service using a QR code may be combined with a computer which is hardware to execute the above-mentioned method and may be stored in a medium.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Figure 1:
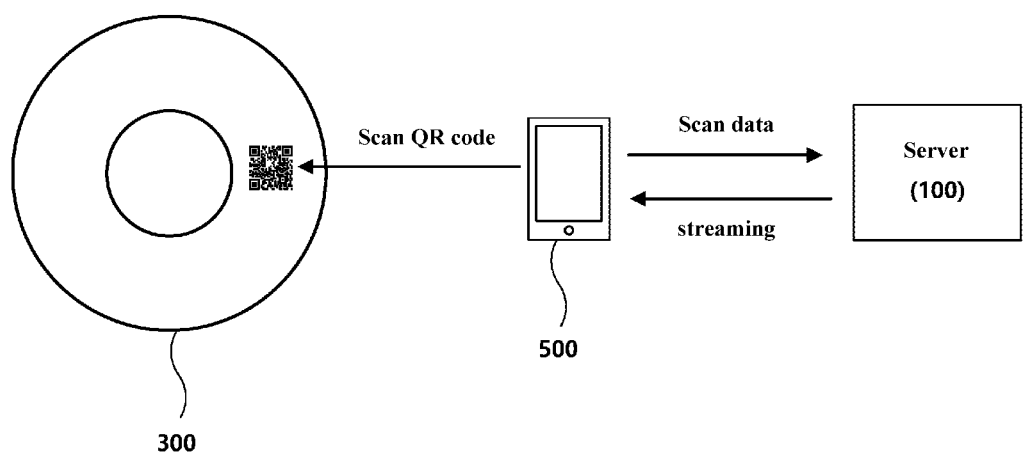
FIG. 1 is a schematic diagram illustrating a streaming service according to an embodiment of the inventive concept.

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other elements other than stated elements but do not exclude presence of additional elements. Like reference numerals designate like elements throughout the specification, and the term "and/or" may include each of stated elements and one or more combinations of the stated elements. The terms such as "first" and "second" are used to describe various elements, but it is obvious that such elements are not restricted to the above terms. The above terms are used only to distinguish one element from the other. Thus, it is obvious that a first element described hereinafter may be a second element within the technical scope of the inventive concept.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

The term "content" in the specification may refer to culture and art information which is configured and distributed with data, such as, a text, a voice, an image, or a video. The term "streaming" in the specification may refer to technology of receiving and playing back data in real time.

Hereinafter, a description will be given in detail of embodiments of the inventive concept with reference to the accompanying drawings.

FIG. 1 is a schematic diagram illustrating a streaming service according to an embodiment of the inventive concept.

A short description will be given of a streaming service according to an embodiment of the inventive concept with reference to FIG. 1.

A user terminal 500 may scan a QR code of a real content product 300 using its image capture means and may transmit scan data of the QR code to a server 100.

The server 100 may authenticate the purchase of the real content product 300 of a user based on the scan data received from the user terminal 500 and may store corresponding content in a purchase list of the user.

The server 100 may provide a streaming service to the user terminal 500 depending on a request of the user such that the user enjoys content using the user terminal 500.

Thus, the user may enjoy content purchased by him or her, using a mobile device, such as a smartphone or a tablet personal computer (PC), or a wearable device.

In this case, the QR code may be printed on the inside of a package of the real content product 300 or at least one surface of a storage medium of the real content product 300. Thus, the QR code may fail to be leaked to the outside before the package of the real content product 300 is opened after the real content product 300 is actually purchased. Further, a watermark may be added to content to prevent illegal distribution of the content.

Figure 2:
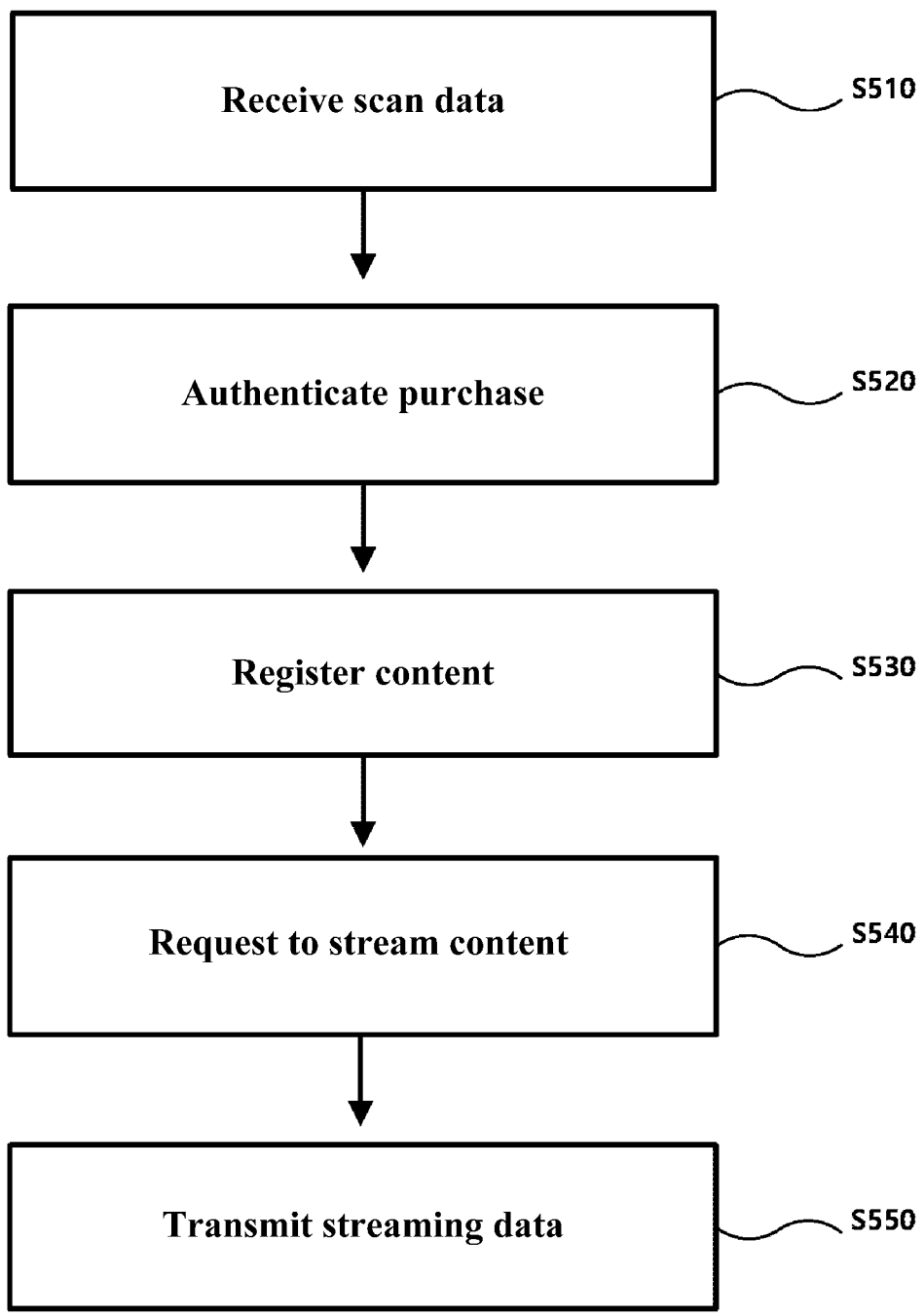
FIG. 2 is a flowchart illustrating a flow of a streaming service according to an embodiment of the inventive concept.
Figure 3:
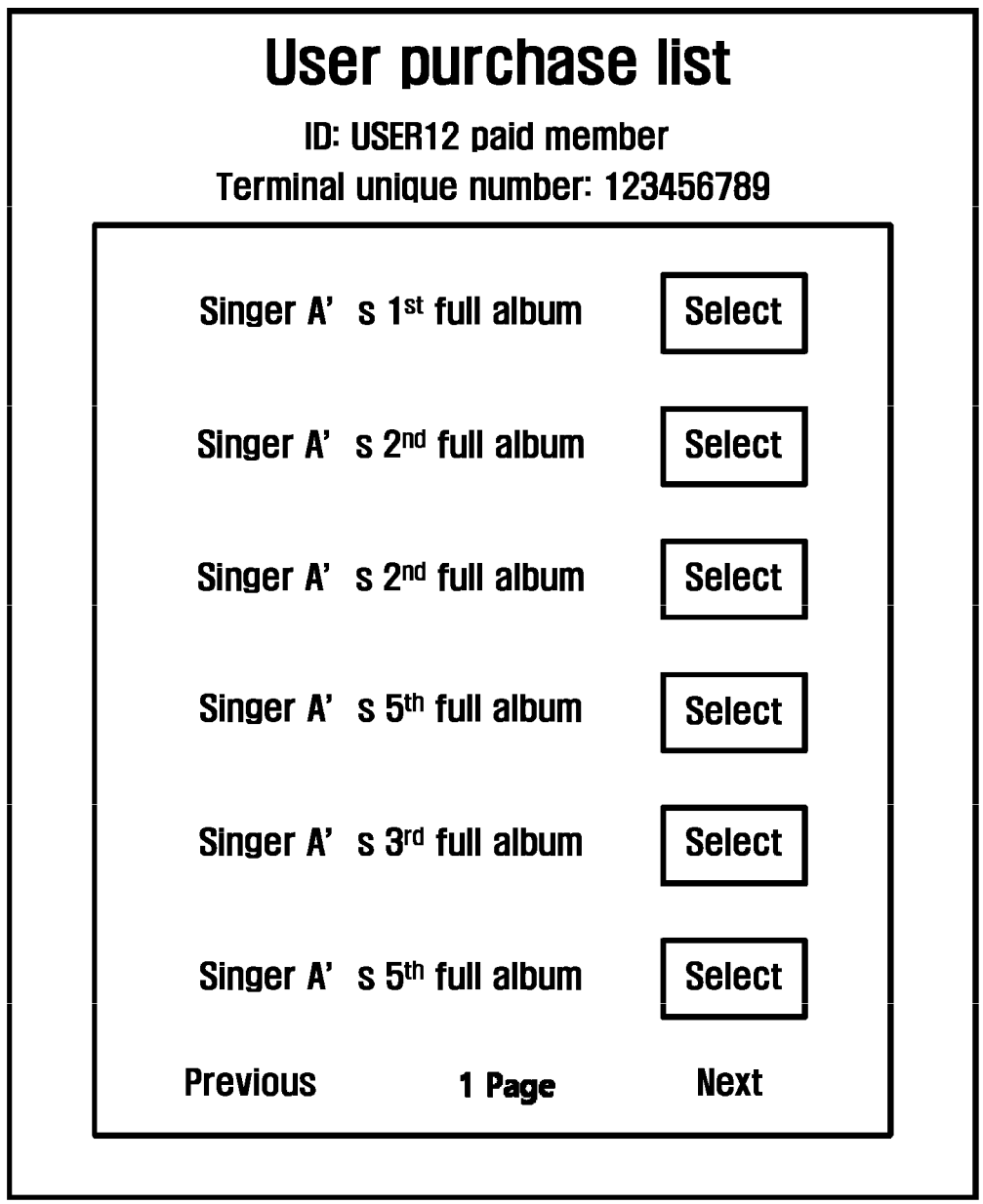
FIGS. 3 to 5 are drawings illustrating a list of content of a user according to an embodiment of the inventive concept.
Figure 4:
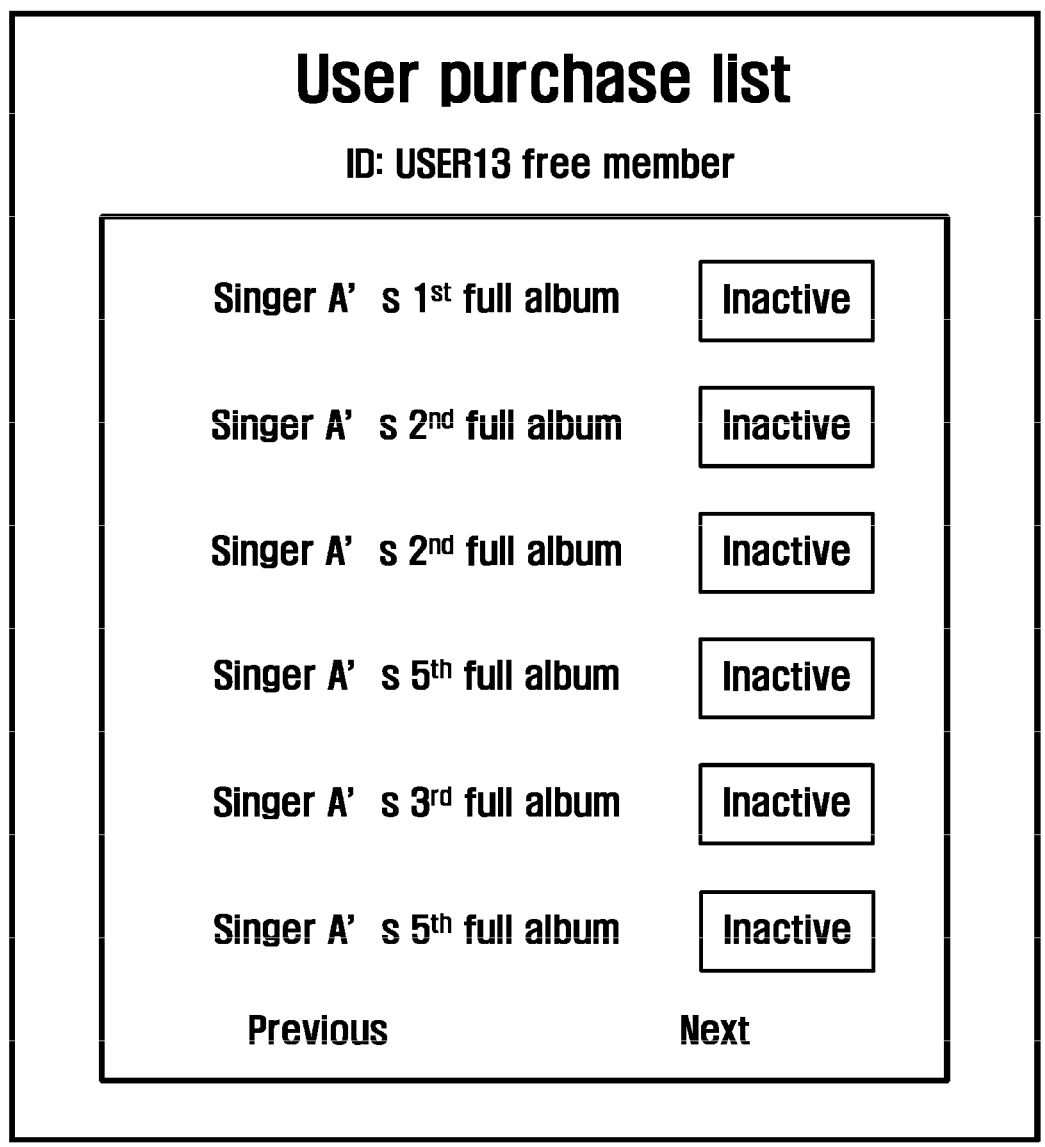
Figure 5:
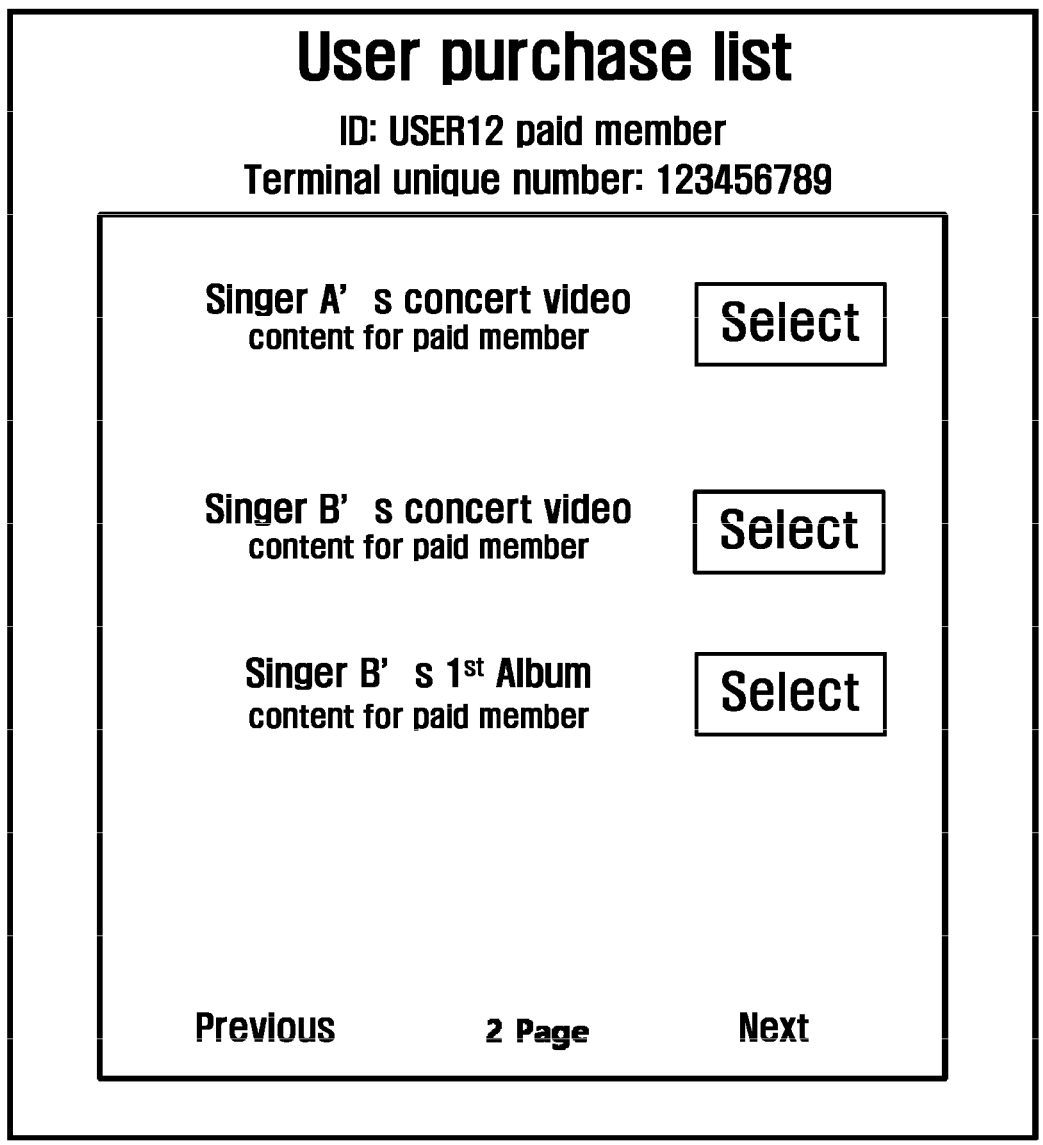
Figure 6:
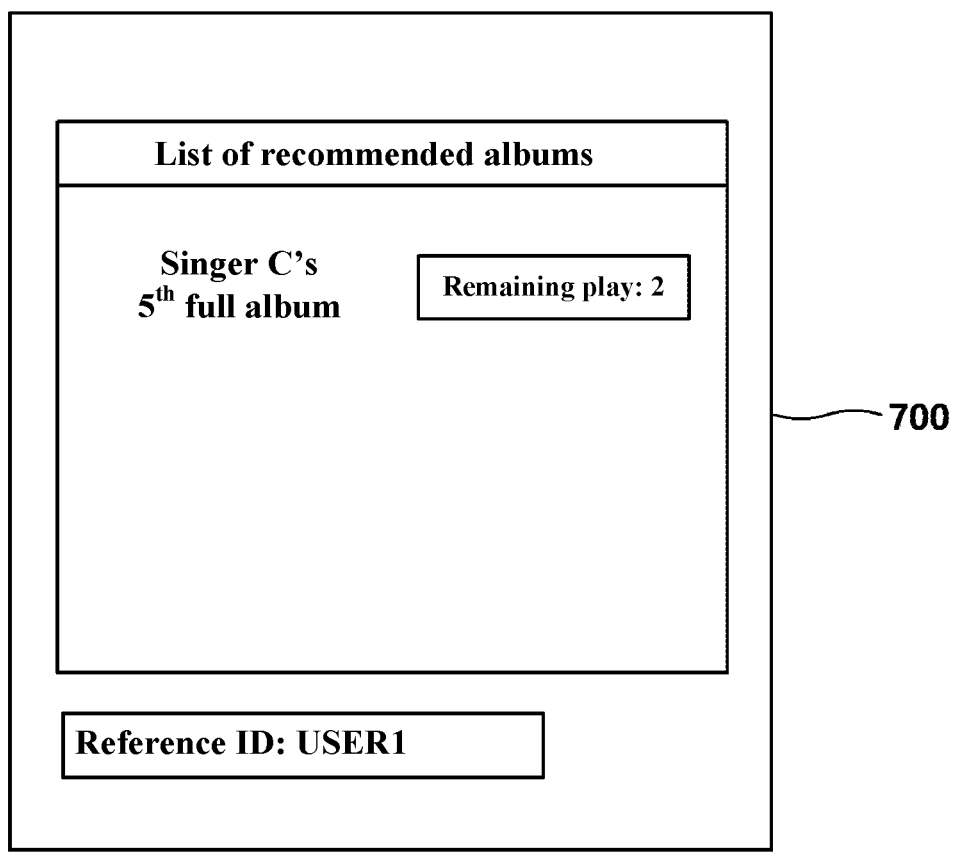
FIG. 6 is a drawing illustrating a list of content of a free member according to another embodiment of the inventive concept.

FIG. 2 is a flowchart illustrating a flow of a streaming service according to an embodiment of the inventive concept. FIGS. 3 to 5 are drawings illustrating a list of content of a user according to an embodiment of the inventive concept. FIG. 6 is a drawing illustrating a list of content of a free member according to another embodiment of the inventive concept.

A description will be given of the flow of the streaming service according to an embodiment of the inventive concept with reference to FIG. 2.

First of all, in operation S510, a server 100 of FIG. 1 may receive scan data of a QR code printed on a real content product 300 of FIG. 1 from a user terminal 500 of FIG. 1.

In general, since each of terminals such as a smartphone and a tablet PC has an image capture means, the scan data may refer to data obtained by capturing and scanning a QR code. In operation S520, the server 100 may authenticate the purchase of the real content product 300 of a user based on the scan data and may register unique information of the user terminal 500 which transmits the scan data.

Herein, different QR codes may be printed on respective real content products. When the server 100 authenticates the purchase of the real content product 300, the unique information of the user terminal 500 which transmits the scan data may be registered with the server 100 such that a corresponding QR code is prevented from being authenticated by another user or terminal.

Thus, each QR code may be authenticated through only one terminal to prevent illegal copy and distribution.

In this case, the unique information of the user terminal 500 may refer to an identifier, such as a unique number or a unique code assigned to the user terminal 500, for example, an international mobile equipment identity (IMEI) or a medium access control (MAC) address of the user terminal 500.

As another embodiment, since it is possible for the user to change the user terminal 500 such as a smartphone, the server 100 may assign the right to change the user terminal 500 to the user. Thus, when receiving a request to change the user terminal 500 from the user terminal 500, the server 100 may request the user to input unique information of the old user terminal 500 and unique information of a new user terminal. When user authentication is completed, the server 100 may move a list of content of the old user terminal 500 to the new user terminal.

Thus, the list of the content of the old user terminal 500 may be deleted and may be displayed on the new user terminal to continue using a streaming service. In this case, the server 100 may verify information of a user account together with unique information of the old user terminal 500 and unique information of the new user terminal to prevent the user from transferring content to anther user.

In operation S530, the server 100 may register content corresponding to the scan data with the list of the content of the user terminal 500.

Since the real content product 300 purchased by the user is to be provided using a high-definition streaming service, it is preferable that the server 100 registers high-definition content corresponding to the real content product 300.

Further, the server 100 may store a photo and a concert video, such as a music list, a music video, an image list, and an album jacket, as the content corresponding to the real content product 300, in the list of the content of the user terminal 500.

In operation S540, the server 100 may receive a request to stream the content registered with the list of the content of the user terminal 500 from the user terminal 500.

The user may access the server 100 through the user terminal 500 to verify the list of the content of the user terminal 500 and select specific content such that the selected specific content is streamed from the server 100.

Thus, the server 100 may receive the request to stream the content registered with the list of the content of the user terminal 500 from the user terminal 500 and may allow the user to select a content file stored in a storage unit of the server 100.

In operation S550, the server 100 may transmit streaming data of the requested content to the user terminal 500.

In detail, the server 100 may transmit streaming data corresponding to the content, requested from the user, to the user terminal such that the user may use a streaming service in real time.

The content streamed to the user terminal 500 may be provided with higher definition that content stored in the storage medium of the real content product 300.

For example, a DVD may provide image quality of 720×480 resolution which is image quality of standard definition (SD) resolution. Recently, since a streaming service is provided with image quality of 1080p high definition (HD) resolution or image quality of 2K or 4K ultra high definition (UHD) resolution, the user may be disappointed due to relatively low image quality.

Thus, the server 100 according to an embodiment of the inventive concept may provide a higher-definition streaming service than the real content product 300 to meet needs of a consumer.

Further, the user terminal 500 may be connected with a large-screen display device, such as a beam projector, a TV, or a monitor, such that a streaming image may be displayed on the large-screen device.

Further, to prevent a malicious user from recording or downloading content and illegally distributing the recorded and downloaded content, the server 100 may monitor the user terminal 500 in real time to prevent the user terminal 500 from attempting to record or download the content using another program.

Thus, when discovering an attempt for the user terminal 500 to record or download content through real-time monitoring, the server 100 may immediately stop transmitting streaming data and may provide a warning message to the user terminal 500.

As another embodiment, when detecting an attempt to record or download content using the user terminal 500 while transmitting streaming data, the server 100 may stop transmitting the steaming data. When the attempt is detected over a predetermined number of times, the server 100 may delete the content from the list of the content of the user terminal 500.

After a predetermined time elapses from a time when the server 100 authenticates the purchase of the real content product 300 of the user, when a user account logged in to the user terminal 500 is an account for paid member, the server 100 may maintain the list of the content of the user terminal 500 in a state where the content is able to be streamed. When the user account is an account for free member, the server 100 may convert the list of the content of the user terminal 500 into a state where the content is unable to be streamed.

For example, referring to FIG. 3, since an identifier (ID) of a user account is displayed as "USER12" and since a paid member is displayed beside the ID, a list of content of the user terminal 500 may be maintained in a state where the content is able to be streamed, such that the user uses a streaming service.

Referring to FIG. 4, since an ID of a user account is displayed as "USER13" and since a user is verified as a free member, it may be seen that a list of content of the user terminal 500 is in a state (inactive state) where the content is unable to be streamed.

Further, when a user account logged in to the user terminal 500 is an account for paid member, the server 100 may additionally register content for paid member with a list of content of the user terminal 500.

For example, FIG. 5 illustrates that singer's concert videos stored in the real content product 300 purchased by the user are provided as content for paid member.

To provide benefits to a paid member, the server 100 may provide a plurality of special content which are not included in the real content product 300 to the paid member to guide free members to register as paid members.

In this case, the plurality of special content may be videos of artists, which are difficult to be obtained on a web. For example, videos such as a singer's concert video, a behind-the-scene video, and a teaser video may be applied.

As another embodiment, as shown in FIG. 6, the server 100 may display the remaining number of playback and a remaining playback time on a list of content of a free member.

Thus, as shown in FIG. 6, the free member may stream a singer C's $5^{th}$ full album twice. When the number of times of streaming the album is over two times, the streaming of the album is inactive to convert a list of content into a state where the content is unable to be streamed and a message for registering as a paid member may be displayed.

Figure 7:
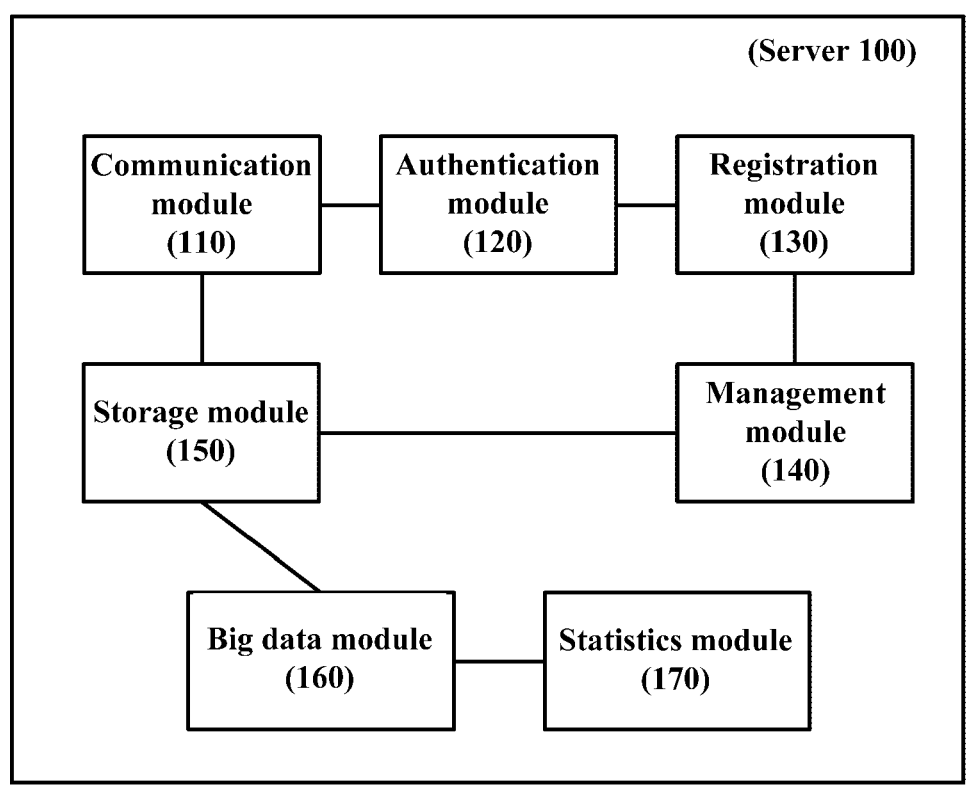
FIG. 7 is a block diagram illustrating a configuration of a streaming server according to an embodiment of the inventive concept.

The server 100 may collect information about a profile of a user account of a user whose purchase of the real content product 300 is authenticated, information about the real content product 300, information about a profile of a user account of the user who requests to stream content, and information about the content requested to be streamed and may store the collected information in a big data storage 160 of FIG. 7.

The server 100 may analyze information stored in the big data storage 160 to generate statistics information about a propensity to consume content.

In this case, the information about the profile of the user account may include at least one of a country, an age, a gender, an address, or a job of the user. Further, the information about the profile of the user account may include information associated with an artist the user prefers or content the user prefers (e.g., a kind of music such as Korean pop (K-pop), pop, hip-hop, or classic).

Thus, the server 100 may collect big data such as content preferred for each country, each age, each gender, or the like, content purchased for each country, each age, each gender, or the like, and content streamed for each country, each age, each gender, or the like and may analyze the big data to generate statistics information, thus using the generated information later in content management, consumer management, or the like.

FIG. 7 is a block diagram illustrating a configuration of a streaming server 100 according to an embodiment of the inventive concept.

A description will be given of the streaming server 100 according to an embodiment of the inventive concept.

A repeated description will be omitted with respect to contents described with reference to FIG. 2.

The streaming server 100 according to an embodiment of the inventive concept may include a communication module 110, an authentication module 120, a registration module 130, a storage module 150, a management module 140, a big data storage 160, and a statistics module 170.

The communication module 110 may connect the streaming server 100 with a user terminal 500 of FIG. 1 in a wired or wireless manner to transmit and receive data with the user terminal 500.

In detail, the communication module 110 may receive scan data of a QR code printed on a real content product 300 of FIG. 1.

The authentication module 120 may authenticate the purchase of the real content product 300 of a user based on the scan data received from the user terminal 500 via the communication module 110.

The registration module 130 may register unique information of the user terminal 500 which transmits the scan data with the streaming server 100 and may register content corresponding to the scan data with a list of content of the user terminal 500.

Hereafter, the user may verify the list of his or her content using the user terminal 500 and may select specific content, thus receiving a streaming service.

Thus, the communication module 110 may receive a request to stream content registered with the list of the content of the user terminal 500 from the user terminal 500 and may transmit streaming data of the requested content to the user terminal 500.

In this case, the management module 140 may verify whether a user account is an account for paid member and may verify the unique information of the user terminal 500 to check whether it is possible to stream the requested content.

Further, the management module 140 may verify image quality selected through the user terminal 500 and may allow the communication module 110 to transmit streaming data of the image quality to the user terminal 500.

In this case, the reason that the image quality is selected may be, since the user is unable to use a streaming service of UHD resolution such as 2K or 4K depending on a communication environment of the user, because he or she selects image quality of lower resolution than the UHD resolution, for example, 780 HD or 1080 HD.

Streaming data of a variety of content and content for paid members may be stored in the storage module 150.

The big data storage 160 may collect and store information about a profile of a user account of the user whose purchase of the real content product 300 is authenticated, information about the real content product 300, information about a profile of a user account of the user who requests to stream content, and information about the content requested to be streamed.

The statistics module 170 may analyze the information stored in the big data storage 160 to generate statistics information about a propensity to consume content.

The above-mentioned method for providing a streaming service by authenticating the purchase of a real album according to an embodiment of the inventive concept may be implemented as a program (or application) which is combined with a server which is hardware to be executed and may be stored in a medium.

For the computer to read the program and execute the methods implemented with the program, the above-mentioned program may include a code coded into a computer language such as C, C++, Java, or a machine language readable through a device interface of the computer by a processor (CPU) of the computer. Such a code may include a functional code associated with a function and the like defining functions necessary for executing the methods and may include a control code associated with an execution procedure necessary for the processor of the computer to execute the functions according to a procedure. Further, such a code may further include a code associated with memory reference about whether additional information or media necessary for the processor of the computer to execute the functions is referred at any location (address number) of an internal or external memory of the computer. Further, if it is necessary for the processor of the computer to communicate with any computer or server located in a remote place to execute the functions, the code may further include a communication related code about how communication is performed with any computer or server located in a remote place using a communication module of the computer and whether to transmit and receive any information or media upon communication.

The medium may refer to a device-readable medium which stores data on a semipermanent basis rather than a medium, such as a register, a cache, or a memory, which stores data during a short moment. In detail, the medium may be, for example, but is not limited to, a read only memory (ROM), a random access memory (RAM), a compact disc ROM (CD-ROM), a magnetic tape, a floppy disc, an optical data storage device, or the like. In other words, the program may be stored in various storage media on various servers accessible by the computer or various storage media on the computer of the user. The medium may be distributed to a computer system connected over a network and may store a computer-readable code on a distributed basis.

Operations of the method or algorithm described in connection with an embodiment of the inventive concept may be directly implemented in hardware, may be implemented with a software module executed by hardware, or may be implemented by a combination of the hardware and the software module. The software module may reside on a random access memory (RAM), a read only memory (ROM), an erasable programmable ROM (EPROM), an electrically erasable programmable ROM (EEPROM), a flash memory, a hard disc, a removable disc, a CD-ROM, or any type of computer-readable storage medium which is well known in the technical field to which the inventive concept pertains.

According to embodiments of the inventive concept, the user whose purchase of the real content product is authenticated through the QR code may stream content using the user terminal to view the content anytime or anywhere.

Further, embodiments of the inventive concept may overcome the limit of image quality of a DVD or the like and may meet needs of a consumer by providing a higher-definition streaming service than the real content product.

Further, embodiments of the inventive concept may prevent illegal copy and distribution and may easily manage traffic simultaneously accessed by content streaming by authenticating only one terminal per QR code.

Further, embodiments of the inventive concept may authenticate the purchase of a product, may stream content, may download content, may manage users, and may generate and manage user statistics information using one QR code.

The effects of the inventive concept are not limited to the effects described above, and other effects which are not described above may be clearly understood to those skilled in the art from the above description.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A method for providing a content streaming service and managing data statistics of a user using a quick response (QR) code, the method comprising:
    receiving, by a server, scan data of the QR code printed on a real content product of the user from a user terminal;
    authenticating, by the server, the purchase of the real content product of the user based on the scan data and registering unique information of the user terminal which transmits the scan data;
    registering, by the server, content corresponding to the scan data with a content list of the user terminal;
    receiving, by the server, a request to stream the content registered with the content list the user terminal from the user terminal;
    transmitting, by the server, streaming data of the requested content to the user terminal, wherein the content streamed to the user terminal is provided with higher definition than content stored in a storage medium of the real content product;
    collecting, by the server, information about a profile of a user account of the user whose purchase of the real content product is authenticated, information about the real content product, information about a profile of a user account of the user who requests to stream the content, and information about the content requested to be streamed;
    storing, by the server, the collected information in a big data storage of the server;
    generating, by the server, statistics information about a propensity to consume content by analyzing the information stored in the big data storage;
    when the server receives a request to change a registered user terminal from the user terminal to a new user terminal, performing, by the server: authenticating a user of the new user terminal; and transferring the content list to the new user terminal when the user of the new user terminal is authenticated; and
    when the server detects, while monitoring transmission of the streaming data to the user terminal, that the user terminal attempts to record or download the streaming data, stopping, by the server, the transmission of the streaming data.

2. The method of claim 1, further comprising:
    determining, by the server, whether a user account logged into the user terminal is an paid account or a free-of-charge account; and
    performing, by the server, after a predetermined time elapses from a moment that the server authenticates the purchase of the real content product of the user:
        maintaining, when the user account is the paid account, the content list of the user terminal in a state where the content is able to be streamed; or
        converting, when the user account is the free-of-charge account, the content list of the user terminal into a state where the content is unable to be streamed.

3. The method of claim 2, wherein the determining further comprising:
    when the user account is the paid account, additionally registering, by the server, one or more contents that is exclusive to paid members, to the content list of the user terminal.

4. The method of claim 1, wherein the QR code is printed on the inside of a package of the real content product or on at least one surface of the storage medium of the real content product.

5. The method of claim 1, wherein the content comprises one or more of a text, an audio, an image, or a video.

6. A non-transitory computer-readable recording medium storing a computer program, and configured to be combined with a computer, which is a hardware, the program includes instructions to execute the method of claim 1.

7. The method of claim 2, wherein the determining further comprising:
    when the user account is the free-of-charge account, transmitting, by the server, information on a remaining number of playback and a remaining playback time for a respective content included in the content list of the user terminal.

* * * * *